United States Patent [19]

Rossman

[11] 4,371,872
[45] Feb. 1, 1983

[54] FRACTIONAL CLOCK EDGE SMOOTHER FOR A REAL-TIME SIMULATION OF A POLYGON FACE OBJECT SYSTEM

[75] Inventor: Walter A. Rossman, Cupertino, Calif.

[73] Assignee: The Singer Company, Binghamton, N.Y.

[21] Appl. No.: 59,819

[22] Filed: Jul. 23, 1979

[51] Int. Cl.³ .............................................. G09G 1/16
[52] U.S. Cl. .................................. 340/728; 340/723; 340/721; 340/744
[58] Field of Search ............... 340/723, 724, 728, 720, 340/721, 744

[56] References Cited

U.S. PATENT DOCUMENTS

| | | | |
|---|---|---|---|
| 4,119,956 | 10/1978 | Murray | 340/728 |
| 4,127,850 | 11/1978 | Vallins | 340/728 |
| 4,137,530 | 1/1979 | Hooker, Jr. | 340/723 |

Primary Examiner—Marshall M. Curtis
Attorney, Agent, or Firm—Jeff Rothenberg; Douglas M. Clarkson

[57] ABSTRACT

The data base for an aircraft flight simulator provides position data for each vertex of each object face in the gaming area plus color, intensity, etc. for each face. The vertex data is combined with aircraft position data and processed to generate two dimensional display vectors (Vd=Xd+Yd) for each vertex. A display generator converts the Xd portion for each vertex into a series of scanline-edge intersections Xdc which define the leading and trailing intersections between each horizontal scanline and the edges of each face. The MSB portion of the intersection coordinate Xdc of each scanline-edge intersection is compared to the incrementing pixel number as the scan proceeds to determine which pixel contains the intersection. The actual change within each pixel of intensity or color associated with scanning across the edge is determined by the LSB portion of Xdc. Each pixel is subdivided into a set of fractional pixels having progressively delayed START DISPLAY times. The LSB portion identifies the particular start time for each edge-scanline intersection. This increased resolution in the horizontal position of each change in intensity or color correspondingly reduces the horizontal dimension of the "staircase" effect inherent in digital displays. The spacing between adjacent START DISPLAY times may be adjusted to accommodate the "worst case" requirement of clearance between start pulses. The resulting series of nonuniformly spaced start times may then include more start times within a single pixel, further reducing the staircase effect.

6 Claims, 5 Drawing Figures

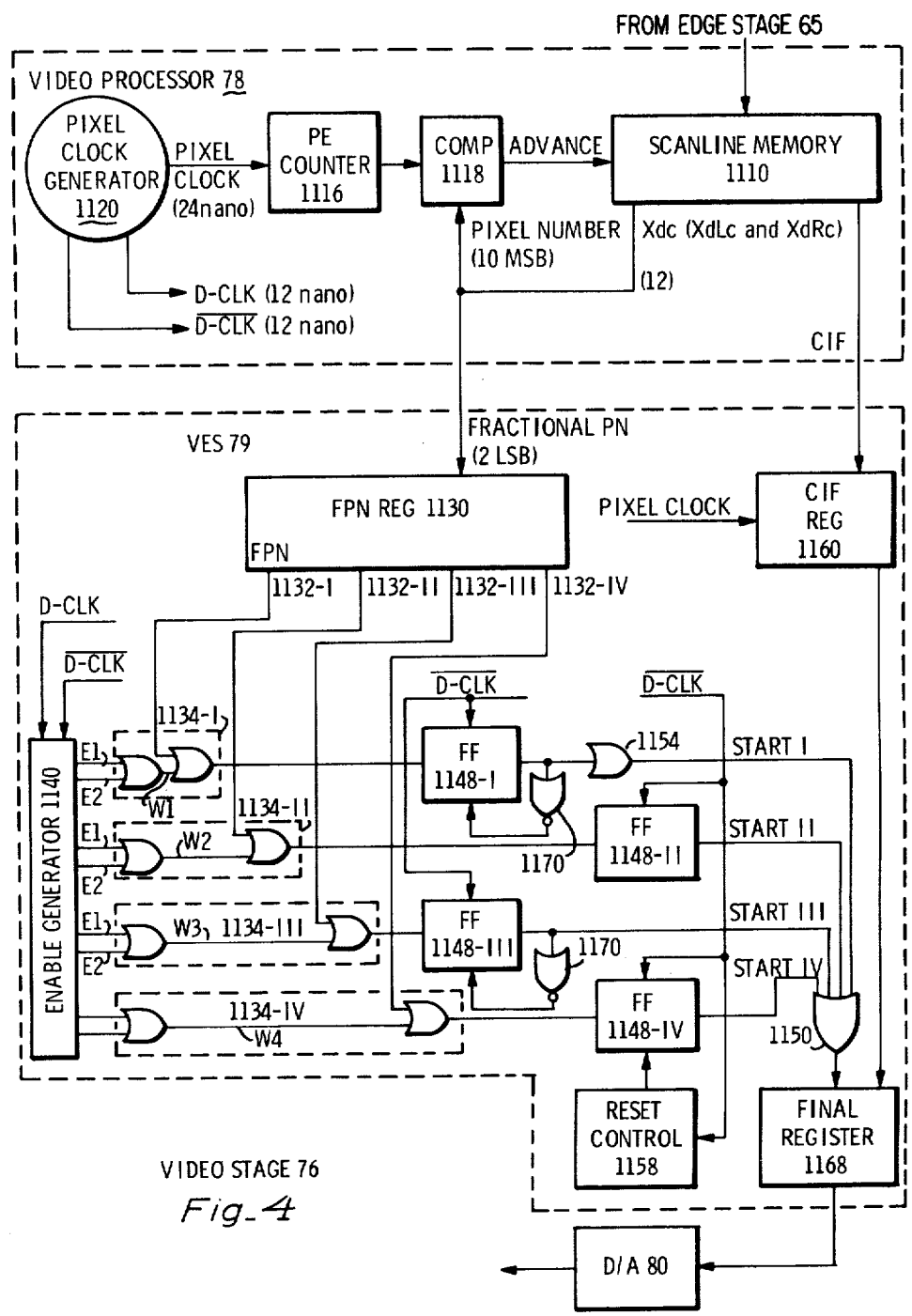
Fig_4

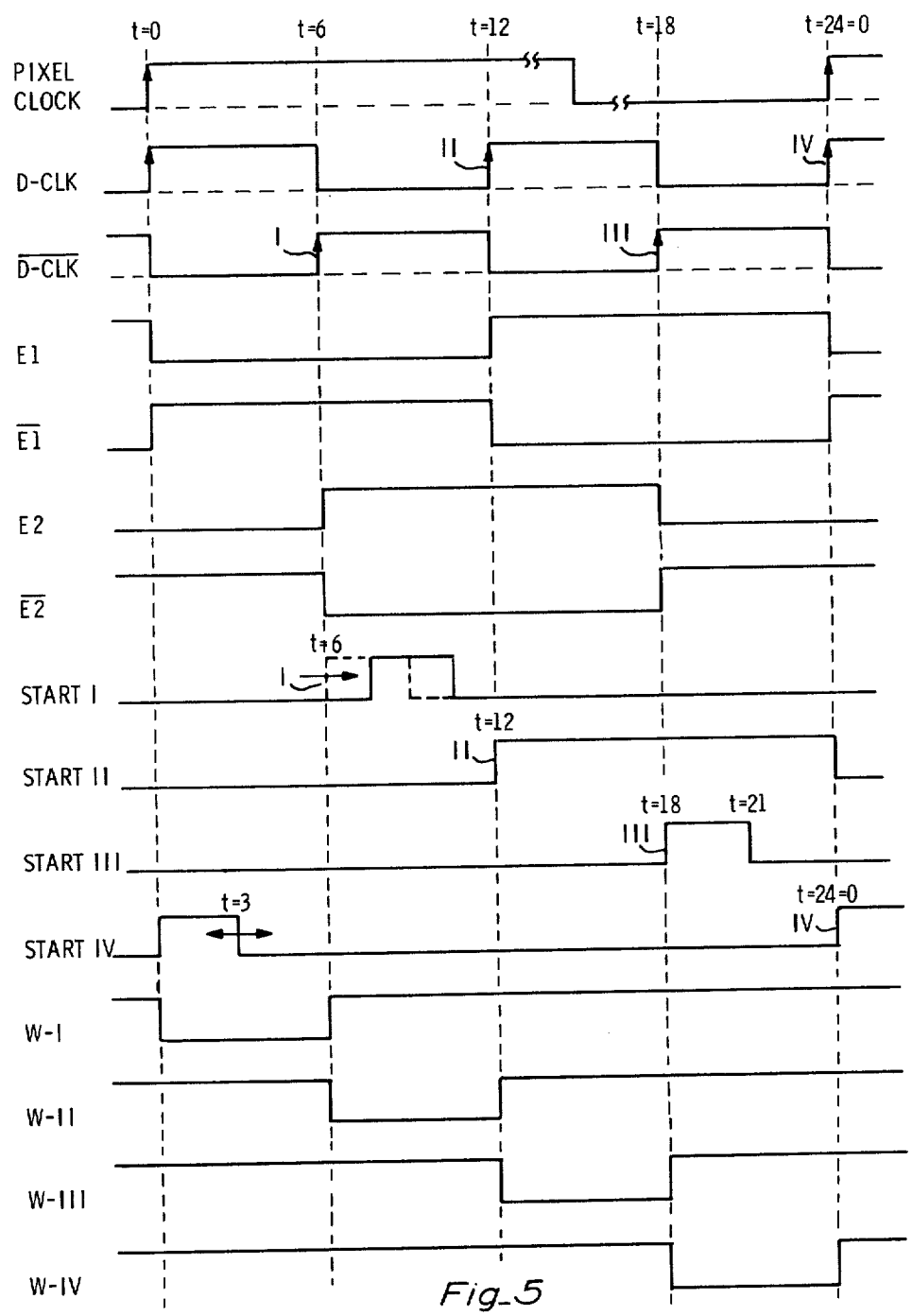
Fig_5

FRACTIONAL CLOCK EDGE SMOOTHER FOR A REAL-TIME SIMULATION OF A POLYGON FACE OBJECT SYSTEM

BACKGROUND OF THE INVENTION

This invention relates to real-time digital image generation in which the scanline pixels are subdivided into fractional pixels to minimize the "staircase" effect, and more particularly to such image generation in which the fractional pixels within each pixel are nonuniform in size.

Heretofore, the "staircase" effect has been reduced by increasing the pixel clock rate to generate smaller pixel periods with a correspondingly greater scanline position resolution. The maximum reliable clock rate is limited by the separation between adjacent clock pulses. Fast hardware such as ECL-III and other fast logic techniques may be employed to increase the maximum clockrate. The clockrate may be increased until the trailing portion of each clockpulse overlaps with the rising portion of the next pulse causing spurious clocking effects.

SUMMARY OF THE INVENTION

It is therefore an object of this invention to provide a real-time simulation visual system with a reduced staircase effect.

It is another object of this invention to provide a reduced "staircase" effect without increasing the pixel clock rate.

It is a further object of this invention to reduce the "staircase" effect by subdividing the pixel clock into fractional pixel.

It is yet another object of this invention to reduce the "staircase" effect by subdividing the pixel clock period into unequal fractional periods.

DESCRIPTION OF THE FIGURES

Further objects and advantages of the present invention, and the operation of the vertical edge smoother, will become apparent from the following detailed description taken in conjunction with the drawings, in which:

FIG. 4 is a block diagram of video stage 76 showing the generation of START signals; and FIG. 5 is a timing diagram showing the waveforms employed in VES 79.

GENERAL DESCRIPTION OF FLIGHT SIMULATION SYSTEM 10

Figure 1:
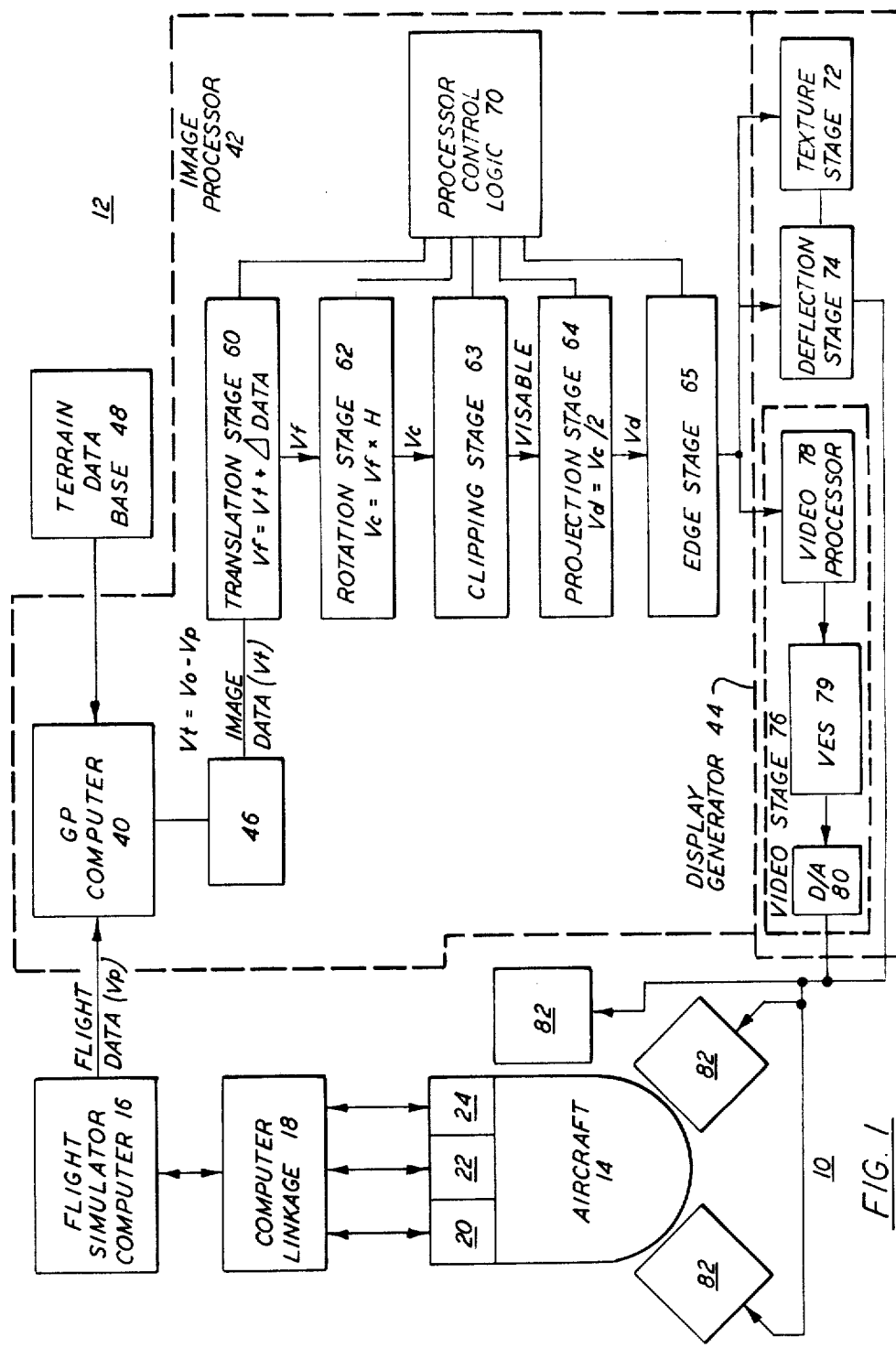
FIG. 1 is a block diagram of DIG visual system 10 and peripheral flight simulation equipment showing data flow relationships.

FIG. 1 shows a flight simulation system 10 with visual capabilities provided by a digital visual system 12. A simulated aircraft 14 is linked to flight simulation computer 16 and visual system 12 through computer linkage 18. Flight computer 16 controls motion system 20 and instrument system 22 of aircraft 14 in response to the pilot's maneuvering action at aircraft controls 24. Visual system 12 is formed by general purpose computer 40 (such as Digital Equipment Corporation PDP 11/35) plus image processor 42, display generator 44, and interface controller 46. Interface controller 46 is provided to process flight data from aircraft 14 to image processor 42 and to control image data flow from GP computer 40 to image processor 42 via a data buffer.

GP computer 40 receives flight data, such as aircraft position Vp, aircraft roll, pitch, and yaw attitude (H matrix), etc. from computer 16. GP computer 40 additionally receives terrain data (both natural formations and cultural structures) from data base 48 such as runways, towers, hangers, roads, rivers, fields, moving objects, etc. In general visual system 12 may process and display terrain features consisting of points, lines, closed convex polygons, or combinations thereof. Preferably the aircraft position data is an aircraft position vector Vp extending from the simulated position of aircraft 14 to the origin of the terrain coordinate system. In order to simplify conception and data organization, the terrain origin is preferably located proximate the touchdown area of the runway, and the x-axis of the terrain coordinate system from data base 48 is coincident to the runway centerline. An updated Vp is supplied each frame by flight simulation computer 16 as the flight parameters of aircraft 14 change. The earth data also includes the position of certain landmark points (Vo) such as the first vertex of each face, and the relative position of the points forming other terrain features (delta data). Translation stage 60 subtracts Vp from each Vo to form translated vectors (Vt=Vo−Vp). Translation stage 60 then combines the delta with the appropriate Vt to provide the remaining face vertex vector Vf for each face (Vf=Vt+delta data). Rotation stage 62 provides channel vectors Vc to projection stages 64 which project the three-dimensional Vc into two-dimensional display coordinates or vectors Vd. Edge stage 65 provides a list of visible edges defined by the end points and the slope. The data flow through image processor 42 and the mode of operation thereof is controlled by processor control logic 70.

Texture stage 72 within display generator 44 receives the visible edge list for coordination with the display raster. Deflection stage 74 provides the required analog deflection voltages to CRT display devices 82. Video stage 76 receives the color, intrinsic intensity, and size portion of the data for controlling the CRT beam voltage, current, and focus. Video processor 78 stores the current scanline of the pixel data in order of increasing x coordinate and advances the pixel data in response to a pixel clock. Vertical edge smoother (VES) 76 defines several display start times within each pixel time period for more closely coordinating the display position of pixel data with the x-coordinate. The CRT in device 82 is preferably a beam penetration, random deflection tube which allows precise control of spot position, continuous control of spot focus and diameter.

Further details of visual system 12 may be found in Sections VI-XIII and FIGS. 2-8 of U.S. Pat. No. 4,152,766 by Osofsky, et al issued on May 1, 1979, which are hereby incorporated by reference.

Figure 2:
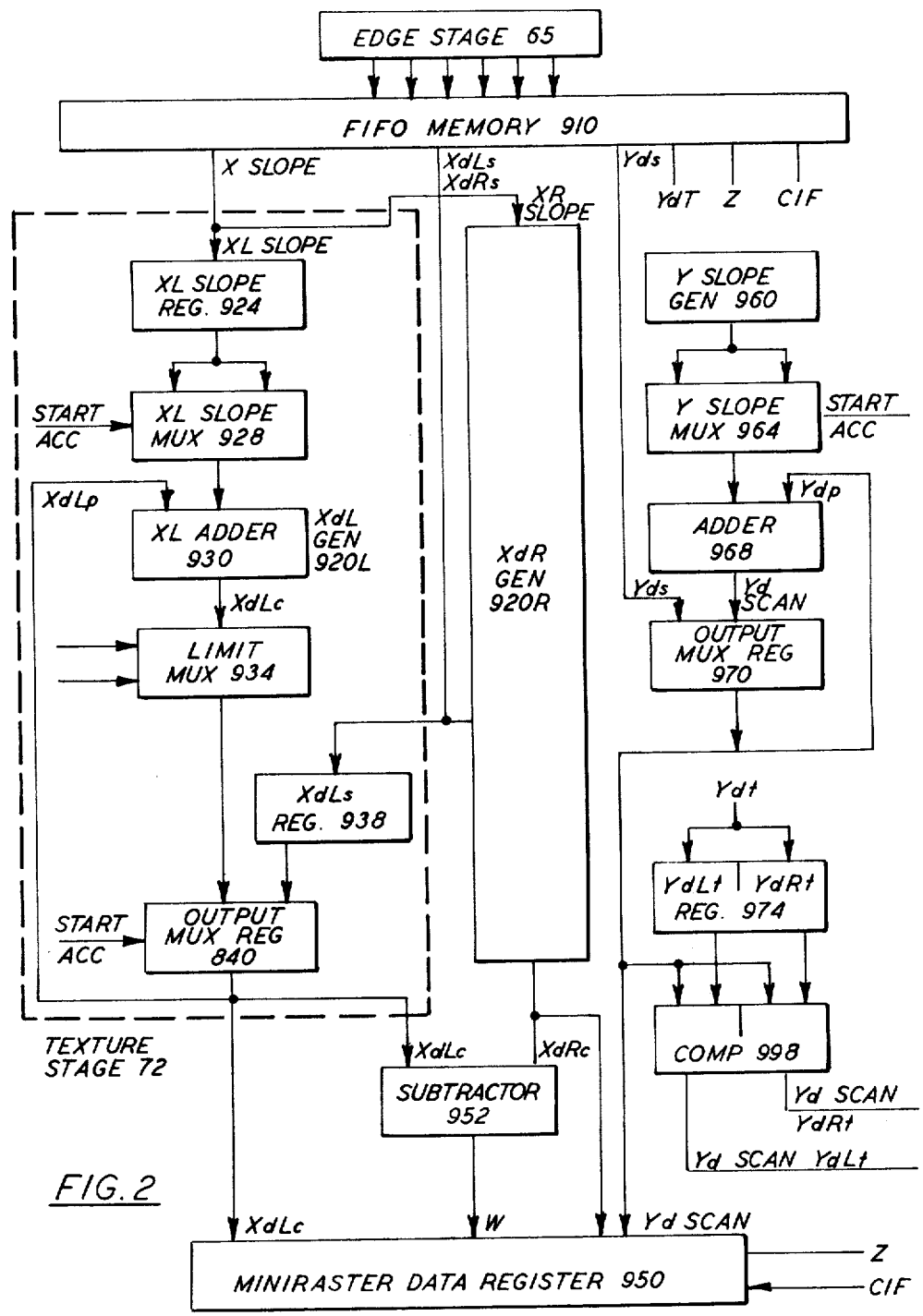
FIG. 2 is a block diagram of texture stage 72.
Figure 3:
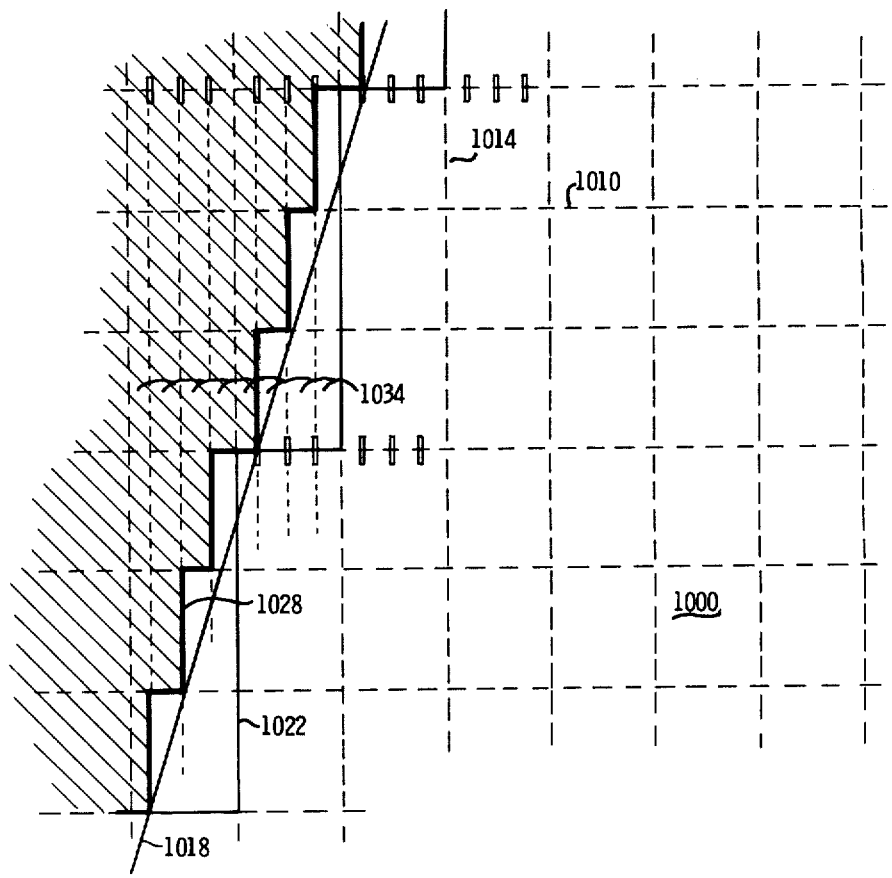
FIG. 3 is a fragmentary diagram illustrating the reduction of the staircase effect.

FIG. 2A is a pictorial representation of an aircraft, terrain features, and image vectors; FIG. 2B shows outcoding regions; FIG. 3 shows translation stage 60 and the generation of face vertex vectors Vf; FIG. 4 shows rotation stage 62 where Vf is multiplied by an H matrix to provide channel vector Vc (Xc, Yc, Zc); FIG. 5 shows clipping stage 63 which eliminates data outside the field of vision; FIG. 6 shows projection stage 64 where Vc is projected into the X-Y plane to form display vector (Vd); FIG. 7 shows edge stage 65 which identifies the edges of each polygon face; and FIGS. 8A-E shows processor control logic 70. As stated previously above, each of these FIGS. 2-8 of U.S. Pat. No. 4,152,766 is incorporated by reference herein.

DISPLAY GENERATOR 44

Texture Stage 72, shown in FIG. 2, provides miniraster data for the set of horizontal scan lines forming each face. The width of the miniscan lines progressively increase and/or decrease in response to the face edge list (Xds, Yds, Xslope, and Ydt for each edge) from edge generation stage 65. The miniraster data from texture stage 72 for each miniscan line includes the Xd coordinate of the left hand end point (XdL), the width of the miniscan line (W), the Yd coordinate (Yd scan), Zc and CIF.

The edge list is loaded into memory 910 by face in order of increasing Yd's once each frame, and is sequentually extracted in the same order twice each frame—once for the field of even miniscan lines, and once for the field of add miniscan lines. X coordinate generators 920L and 920R provide the end points XdLc and XdR respectively for each miniscan line by combining Xds with the Xslopes of the two opposed edges of the face which contain the end points of the scan line. XdLs is incremented by the left hand slope (XL slope) to form each XdL end point; and XdRs is incremented by the right hand slope (XR slope) to form each XdR end point. Only generator 920 is shown in detail. Slope multiplexer 928 divides the XL slope by two (select START) for the first scanline of the even field, to accomodate the one half scan height displacement between the interlaced odd and even fields on display 82. During the remainder of the display cycle, the XL slope is passed through slope multiplexer 928 without division (select ACC) to accomodate the proper height spacing between adjacent miniscan lines in the same field. Adder 930 combines the x coordinate of the previous scan line (XdLp) with the current XL slope to provide the current x coordinate (XdLc). Output multiplexer register 940 provides either XdLs (select START) or XdLc (select ACC) to miniraster data register 950. Subtractor 952 provides the width W of each scan line by subtracting XdLc from XdRc (output of generator 920R). The Y coordinate of the miniscan lines (Yd scan) is similarly formed by incrementing YDs with Yslope from Yslope generator 960. At the end of each edge, Yd scan equals or exceed the Ydt on the left edge (YdLt) or right edge (YdRt). The signals Yd scan ≧ YdLt and Yd scan ≧ YdRt indicate to control logic 70 that the next XL slope or XR slope is required in Xd generators 920.

DETAILED DESCRIPTION

FIFO memory 910 may be a 2048 words×100 bits memory (two hundred 82S11's) for sequentially outputting the complete edge list twice each cycle. Memory 910 interfaces with the remainder of texture stage 72 through a 100 bit register (twenty-five 74S175's).

XL slope register 924 may be a 20 bit storage register (five 74S175's) for holding each new Xslope as they are provided by memory 910.

XL slope multiplexer 928 may be a 20 bit 2:1 multiplexer (five 74S157's) with the START input right shifted to provide a division by two. The START and ACC select are provided by control logic 70.

XL Adder 930 may be a 20 bit adder (five 74283's) for incrementing each provious X left coordinate (XdLp) by the current XL slope.

Limit multiplexer 934 may be a 20 bit 4:1 multiplexer (ten 74S153's) for preventing underflow and overflow when an edge approaches the display boundary. The four inputs are XdLc (twice), all ones (overflow), and all zeros (underflow). The two select inputs are the sign bits of XdLc and XL slope. Underflow occurs when both sign XdLc is negative and sign XL slope is negative. Overflow occurs when sign XdLc is negative and sign XL slope is positive.

XdLs register 938 may be a 12 bit register (three 74S175's) for holding the x coordinate of the starting end point of the current edge (Xds) as it is provided by FIFO memory 910.

Output multiplexer register 940 may be a 20 bit 2:1 multiplexer register (five 25S09's) for accumulating XdLc and outputting either XdLs or XdLc. The output is returned to adder 930 and forwarded to miniraster data register 950.

Miniraster data register 950 may be a 76 bit register (nineteen 74S175's) for holding the miniraster date XdLc 12 bits, W 12 bits, Yd scan 12 bits, CIF 24 bits, and Z 16 bits.

Subtractor 952 may be a 12 bit register (three 74283's and two 74S04's) for providing the width of each miniscan line (W=XdRc−XdLc) to register 950.

Yslope generator may be a 12 bit register (three 74S175's) hardwired to specify the maximum number of miniraster scan lines per frame. This number defines the scan density or Yslope.

Yslope multiplexer 964 may be a 12 bit multiplexer (two 74S157's) similar in function to Xslope multiplexer 928.

Y Adder 968 may be a 12 bit adder (three 74283's) for combining the 12 bits of Yslope with the 12 bits of Y coordinate of the previous scan line (Ydp) to form the Y coordinate of the current scan line (Yd scan).

Multiplexer register 970 may be 12 bit multiplexer register (three 25S09's) similar in function to output multiplexer register 940.

Ydt register 974 may be a pair of 12 bit registers (six 74S175's) for holding the Yd coordinates of the left hand edge termination point (YdLt) and the right hand edge termination point (YdRt) which are periodically forwarded by FIFO memory 910.

Comparator 978 may be a pair of 12 bit compartors (six 74S85's) for comparing Yd scan with YdLt and YdRt to determine the end of each edge.

DEFLECTION CONTROL 74

Deflection stage 74 receives each Yd scan accompanied by a series of XdLc's and W's for generating the sweep voltages which provide the series of horizontal scan lines outlining each polygon face. Yd scan identifies vertical position of the first vertex. XdL identifies the left hand start of each scan line thereafter. W determines the length of each scan line. Conventional integrator techniques may be employed to provide the appropriate X and Y ramp deflection voltages. The Y ramp changes at a uniform rate starting at Yd scan to move the CRT beam vertically across the face being displayed. The X ramps change at a much faster rate starting from an XdL to move the beam horizontally a distance indicated by the associated W. Suitable deflection techniques are disclosed in detail in U.S. Pat. No. 3,999,308 entitled "Real-Time Simulation of a Point System Having Textured Areas as Viewed by a Moving Observer" issued on Dec. 28, 1976 to Robert Louis Peters.

VIDEO STAGE 76

Video stage 76 receives color and intensity data from CIF 660 in projection stage 64 for each face being displayed to control the color and display brightness of the scan lines forming that face. If desired, the display intensity may be attenuated by Zc data for range simulation. Suitable video control techniques are also disclosed in detail in U.S. Pat. No. 3,999,308.

FULL RASTER EMBODIMENT

If desired, the edge list from register 760 may be displayed on a full raster in the conventional frame manner across the entire screen of display device 82. The vertices of all visible polygon faces (or visible portions thereof) for each frame are sorted by Yds to arrange the vertices in display order by raster. Next, the contents of each scan line are sorted by Xds to arrange the vertices in order of display within each scan line. The resulting Yds-Xds sorted edge list with accompanying slope and Ydt data is processed through a conventional full raster display generator which generates the leading and trailing intersections (XsLc and XdRc) to provide the necessary vertical and horizontal sweep voltage waveforms.

VERTICAL EDGE SMOOTHING

FIG. 3 illustrates how the "staircase" effect may be minimized by increasing the positioning resolution of data along the scanlines. A portion of the display on display device 82 is depicted within region 1000. The pixel matrix is outlined by scanlines 1010 (horizontal dashed lines) and pixel clock periods 1014 (vertical dashed lines). A steep face edge is shown in its ideal form by straightline 1018. Large staircase 1022 represents how the display of edge 1018 would appear without vertical edge smoothing, as controlled directly by the pixel clock. The video data (intensity and color) is forwarded to D/A 80 only at the start of the current pixel. VES 79 generates fractional pixels which permit the display of video data at one of several start times within the pixel period. Small staircase 1028 represents the vertical edge smoothing effect of the display edge 1018 caused by the sub-pixel periods. The horizontal portion of each large step (one pixel period) is subdivided into a series of sub-pixel periods 1034 (vertical dotted lines). The sub-pixels provide data to be displayed with increased positional resolution along each scanline.

FIG. 4 shows the circuit details and interconnection of videoprocessor 78, and D/A 80. Scanline memory 1110 receives the horizontal display coordinate Xdc (XdLc or XdRc) and CIF data for each edge-scanline intersection occurring along the current scanline (Yd SCAN). The MSB portion of each horizontal display coordinate Xdc is the pixel number of that intersection along the scanline. Each display pixel has a width along the scanline of one pixel clock period (about 24 nanoseconds in the FIG. 4 embodiment). The intersection having the smallest Xdc is the first to be displayed. The pixel number of this first intersection is immediately entered into pixel comparator 1118 for comparison with the pixel count stored in counter 1116 generated by pixel clock generator 1120. When the pixel count increases to the value of the stored pixel number, scanline memory 1110 is advanced and the CIF data associated with the first intersection is passed through FP segments 1160 and CIF output register 1168 for display. The intersection with the next smallest horizontal coordinate Xdc is next to be displayed, and is entered into comparator 1118 for comparison with the increasing pixel count. Each intersection is thus advanced from scanline memory 1110 for display in order of increasing Xdc at the proper x position along the current scanline—to the nearest 24 nanoseconds.

The LSB portion of XdLc (or XdRc) is the sub-pixel number (Sub-PN) and defines a start time within the current 24 nanoseconds pixel period at which the current video data will actually be displayed. The FIG. 4 embodiment has two bits of Sub-PN which define four intrapixel start times (I, II, III, and IV) which are, in theory, six nanoseconds apart. As the pixel number for the current interface is entered into pixel counter 1116, the associated Sub-PN is entered into fractional pixel (FP) register 1130 where it provides a low signal to one of the Sub-PN outputs 1132-I, 1132-II, 1132-III, or 1132-IV, and also on the top input to the corresponding 3-way wired OR gate 1134-I, 1134-II, 1134-III, or 1134-IV.

The lower inputs to gates 1134 receive staggered enable signals (See FIG. 5) from enable generator 1140. The output of junctions 1134 activate FN flipflops 1148-I, 1148-II, 1148-III, and 1148-IV respectively to provide START I, START II, START III, and START IV (See FIG. 5). Only one of the START signals is available each pixel period as determined by the FP number from FP Register 1130. The beginning of the selected START signal is determined by the positive transitions of either $\overline{\text{D-CLK}}$ (applied to FN flipflops 1148-I and 1148-III) or D-CLK (applied to FN flipflops 1148-II and 1148-IV). The START signals are applied to OR gate 1150 for activating final register 1168 which provides the required CIF data to D/A 80 causing the display to changes as the scanline intersects the face edge.

The worst case situation is created when the fractional number of a particular pixel is IV, and the fractional number of the next pixel is I. The START IV signal and START I signal are generated very close in time. If they overlap, OR gate 1150 may generate a marginal output causing spurious results from final register 1168. Such proximacy in time is not possible with any other pair of START signals. This worst case may be mitigated by delaying the beginning of START I via OR gate 1154 and hastening the termination of START IV by reset control 1158, to create the required dead space between the end of START IV and the beginning of START I.

DETAILED DESCRIPTION

Scanline Memory 1110 may be a double buffered RAM (10147's) for providing the Xdc's and associated CIF for the current scanline, while simultaneously receiving similar data from edge stage 65 for the next scanline.

Pixel counter 1116 may be a ten stage counter (three 10136's in series) for counting the 1024 pixel elements in each scanline.

Comparator 1118 may be a ten bit comparator (ten exclusive OR gates—10113's—with outputs wire OR for speed) for comparing the next largest Xd of the current scanline with the pixel number from pixel counter 1116.

FP Register 1130 is a 2-4 decoder (10161) for providing one of the four fractional pixel numbers FPN-0, FPN-1, FPN-2, or FPN-3, at each ADVANCE of scanline memory, plus a four bit register (10141) for holding the current pixel clock period.

Enable generator 1140 may be two stages of one bit flipflops (10231's, two in the first stage and four in the second stage) connected in fan out configuration for providing the four enable signals E-1, $\overline{\text{E-1}}$, E-2, $\overline{\text{E-2}}$, on parallel outputs.

Three way wired OR gate 1134 (I-IV) are merely wiring junctions for connecting three control signals to each flipflop 1148 (I-IV). Wiring junctions are very fast, and have been employed in lieu of actual logic gates which require a small but finite response time.

FP flipflops 1148 (I-IV) may be one bit flipflops (1670) clocked by D-CLK or $\overline{\text{D-CLK}}$ with reset capability.

OR gate 1150 may be a four input OR gate (1660) for combining the outputs of flipflops 1148 (I-IV).

FP-I gate 1154 may be an OR gate (1664) for delaying the beginning of START I about two nanoseconds creating sequential fractional pixels of 4, 6, 6, and 10 nanoseconds respectively.

Reset control 1158 may be an adjustable delay line (150905B from Data Delay Inc.) in series with a gate (1660).

FP Segments 1160 may be a series of registers (10141) for holding the CIF data while the appropriate START signal is generated in VES 79 in response to the two LSB's of Xdc.

Final register 1168 may be a holding register (10231's) for temporarily storing the CIF data during the generation of the START signal for maintaining time alignment between each FP number and the corresponding CIF data.

Reset gates 1170 may be 1660's connected in feedback to flipflops 1148-I and III for terminating the START I and III signal respectively.

CONCLUSION

It will be apparent to those skilled in the art that various changes may be made in the apparatus and techniques described without departing from the scope of the invention. For example, the beginning of START IV may be advanced to create the required separation with START I. Accordingly, the scope of the invention should be determined only by the wording of the following claims and their legal equivalents.

I claim as my invention:

1. An image data system responsive to digital image data including position data which defines the position of the vertices of polygon faces forming the image, and corresponding visual data which defines the visual characteristics of each face, for providing digital display data to a scanline-pixel type display device, comprising:

image processor means for receiving the image position data and providing the display coordinates for each vertex of each polygon face of the image to be displayed on the display device;

means responsive to the display coordinates of each vertex for determining the scanline numbers and pixel numbers within each scanline of the sequence of leading and trailing intersections of the edges of each face with the scanlines, and responsive to the corresponding visual data for providing a video signal to the display device along each scanline between the leading and trailing edge intersections of each face for generating the corresponding visual characteristics for that face on the display device;

scanline memory for receiving each scanline number and the pixel numbers of each intersection within that scanline and the corresponding visual data, and for sequentially providing each intersection pixel number and corresponding data by order of scanline and pixel;

pixel clock for the scanlines;

pixel counter for sequentially incrementing in response to the pixel clock to define the current pixel count as each scanline proceeds;

comparator means for comparing the most significant bit portion of the current intersection pixel number with the current pixel count to advance the corresponding visual data out of the scanline memory;

fractional pixel means responsive to the least significant bit portion of the current intersection pixel number for providing a series of progressively and non-uniformly delayed display start times within the current pixel for controlling the display of the corresponding visual data.

2. The image date system of claim 1, wherein said fractional pixel means provided time delay between the last start time of the previous pixel period and the first start time of the current pixel period which is greater than the delay between the other pairs of consecutive start times.

3. The image data system of claim 1, wherein the series of progressively delayed start times provided by said fractional pixel means includes four separate start times which subdivides each pixel period into four fractional pixel periods.

4. The image data system of claim 3, wherein said fractional pixel means provides a first fractional pixel period which is shorter than the other three fractional pixel periods.

5. The image data system of claim 3, wherein said fractional pixel means provides a fourth fractional pixel period which is longer than the other three fractional pixel periods.

6. An image data system responsive to digital image data including data which defines image position and visual data which defines image face characteristics for providing digital display data to a display device, comprising:

image processor means for receiving the image position data and providing the coordinates for the data to be displayed on the display device;

display generator means responsive to the data coordinates for determining the scanline numbers and the pixel numbers, and said display generator means including logic circuit means having comparatively differing propogation times for the image position data for providing a delayed start time within a pixel to control the display of the visual data.

* * * * *